United States Patent [19]

Kuwamura et al.

[11] Patent Number: 5,119,437
[45] Date of Patent: Jun. 2, 1992

[54] TABULAR DOCUMENT READER SERVICE

[75] Inventors: Yoshinori Kuwamura; Jun Sato, both of Kawasaki, Japan

[73] Assignee: Fujitsu Limited, Kawasaki, Japan

[21] Appl. No.: 615,971

[22] Filed: Nov. 20, 1990

[30] Foreign Application Priority Data

Nov. 20, 1989 [JP] Japan ................. 1-301256

[51] Int. Cl.⁵ ............... G06K 9/34; G06K 9/62; G06K 9/72; G06K 9/20
[52] U.S. Cl. ........................ 382/9; 382/30; 382/36; 382/40; 382/61; 358/453
[58] Field of Search .............. 382/7, 22, 48, 61, 9, 382/30, 36, 40; 358/453

[56] References Cited

U.S. PATENT DOCUMENTS

| 4,811,412 | 3/1989 | Katsurada | 382/9 |
| 4,933,984 | 6/1990 | Nakano et al. | 382/61 |

Primary Examiner—Leo H. Boudreau
Assistant Examiner—Michael R. Cammarata
Attorney, Agent, or Firm—Staas & Halsey

[57] ABSTRACT

A tabular document reader device for recognizing characters on a tubular document which is composed of a plurality of items and which has different categories according to each of the items includes a ruled line extracting portion (14) for detecting and extracting ruled lines from the read tabular document. An item specifying input portion (15) inputs proper reading conditions for items delimited by the extracted ruled lines. A character recognizing portion (17) limits what should be recognized in the respective items according to the input reading conditions for the items.

7 Claims, 5 Drawing Sheets

Fig. 3

| ITEM 1 | ITEM 2 | ITEM 3 |
|---|---|---|
| NAME | ADDRESS | TELEPHONE NUMBER |
| JOHN SMITH | San Jose, CA | 1 2 3 4 |
| ⋮ | ⋮ | ⋮ |

Fig. 4

|  | CHARACTERS TO BE RECOGNIZED | POSTPROCESS |
|---|---|---|
| ITEM 1 | GENERAL | NAME DICTIONARY |
| ITEM 2 | GENERAL | ADDRESS DICTIONARY |
| ITEM 3 | NUMERALS | NONE |

Fig. 6

| JOHN SMITH | San Jose, CA | 123-4567 |
|---|---|---|
| MARY BROWN | | |
| | | |

30 (AREA TO BE READ)
(X1,Y1) → ... → (X2,Y2)

Fig. 7

| FIRST CANDIDATE | JOHN SMITH [S1] San Jose, CA [S1] 123-4567 [S2] MARY BROWN [S1] |
| SECOND CANDIDATE | ICN I N on l e, 0   8   8   PT  RG |
| THIRD CANDIDATE | M                                    C |

S1 ITEM DELIMITER
S2 LINE DELIMITER

TABULAR DOCUMENT READER SERVICE

BACKGROUND OF THE INVENTION

1. Field of the Invention

The present invention relates to a document reader device for optically reading characters on a document and converting them into code information, and particularly to a tabular document reader device for recognizing a string of characters on a tabular document such as a list of names that is formatted in a table.

2. Description of the Related Art

To prepare a data base from a list of names (a roster) or address book, a scanner recognizes the roster or the address book and provides image data of the names and addresses. Based on the image data, a document reader extracts the characteristics of characters contained in the image data and recognizes the characters. There is, however, a requirement for improving the recognition accuracy of the document reader.

Although optical character recognition techniques and their accuracy are improving, the accuracy of recognizing poor quality characters such as badly printed characters and deformed handwritten characters is not acceptable.

Some languages including Japanese use many kinds of characters and involve similar characters such as "力" and "カ" and identical characters such as "力" (KA) in Japanese Katakana and "力" (CHIKARA) in Japanese Kanji. These characters may often deteriorate recognition accuracy.

If the accuracy of directly recognizing characters is poor as mentioned above, it is necessary to limit an object to be recognized. For example, in reading telephone numbers, only numerals will be recognized. It is also effective to carry out, after a first cycle of a recognition process, a postprocess using word information and context information to select a proper choice among several candidates.

Limiting the object to be recognized and using the postprocess have been achieved so far only in optical character recognition (OCR) in reading a formatted document such as an order slip. The formatted document has an already printed format, and the positions of characters written on the document and to be read by the document reader, are fixed. By defining attributes of characters to be written in each blank of the formatted document, it is possible to limit what should be recognized in each blank as well as to use the postprocess with work information provided for each blank.

If a document to be read is not a formatted document, it is impossible to limit the object to be recognized in advance and it is difficult to use the postprocess with word information. It may be possible to carry out a general postprocess for general documents. In this case, however, it is impossible to limit the object to be recognized to a specific word group, so that the recognition accuracy may not be improved.

Some documents such as lists of names are not completely formatted but have ruled lines between items of repeatedly appearing names, addresses, telephone numbers, etc., of the lists. In this sort of tabular document, it is possible to predetermine the attribute of each item according to the kinds of documents.

In this case, the kind of each tabular document must be fixed in advance, otherwise the tabular document cannot be processed in the same manner as in the formatted document, and the attributes such as the position of each item and the characteristics of written items of the document cannot be defined in advance. Namely, it is concluded that some particular types of tabular documents can be handled in the same manner as in the formatted document, but other different types of tabular documents cannot be handled in the same manner.

To solve the above-described problems, an object of the present invention is to provide a document reader that achieves an improved accuracy in reading tabular documents such as lists of names and addresses.

SUMMARY OF THE INVENTION

In accordance with the present invention, there is provided a tabular document reader device for recognizing characters on a tabular document which is composed of a plurality of items and which has different categories according to each of said items comprising: a ruled line extracting means for detecting and extracting ruled lines from the read tabular document; an item specifying input means for inputting proper reading conditions for items delimited by the extracted ruled lines; and a character recognizing means for limiting what should be recognized in the respective items according to the input reading conditions for the items.

In reading a document such as a table or a list of names, the present invention limits an object to be recognized and selects a postprocess dictionary for each item of the document, thereby improving the recognition accuracy of characters in the document. The present invention is particularly effective in limiting what should be read in an item containing numerals and in specifying a postprocess for an item containing names or addresses, thereby improving the recognition accuracy further.

BRIEF DESCRIPTION OF THE DRAWINGS

FIG. 3 is a list of names as an example of a tabular document to be read by the tabular document reader;

FIG. 4 is a table for specifying attributes of items according to an embodiment of the present invention;

FIG. 6 is a diagram showing an example of input image data for explaining the embodiment of the present invention; and FIG. 7 is a diagram showing an example of a result of recognition of the image data of FIG. 6.

DESCRIPTION OF THE PREFERRED EMBODIMENTS

Figure 1:
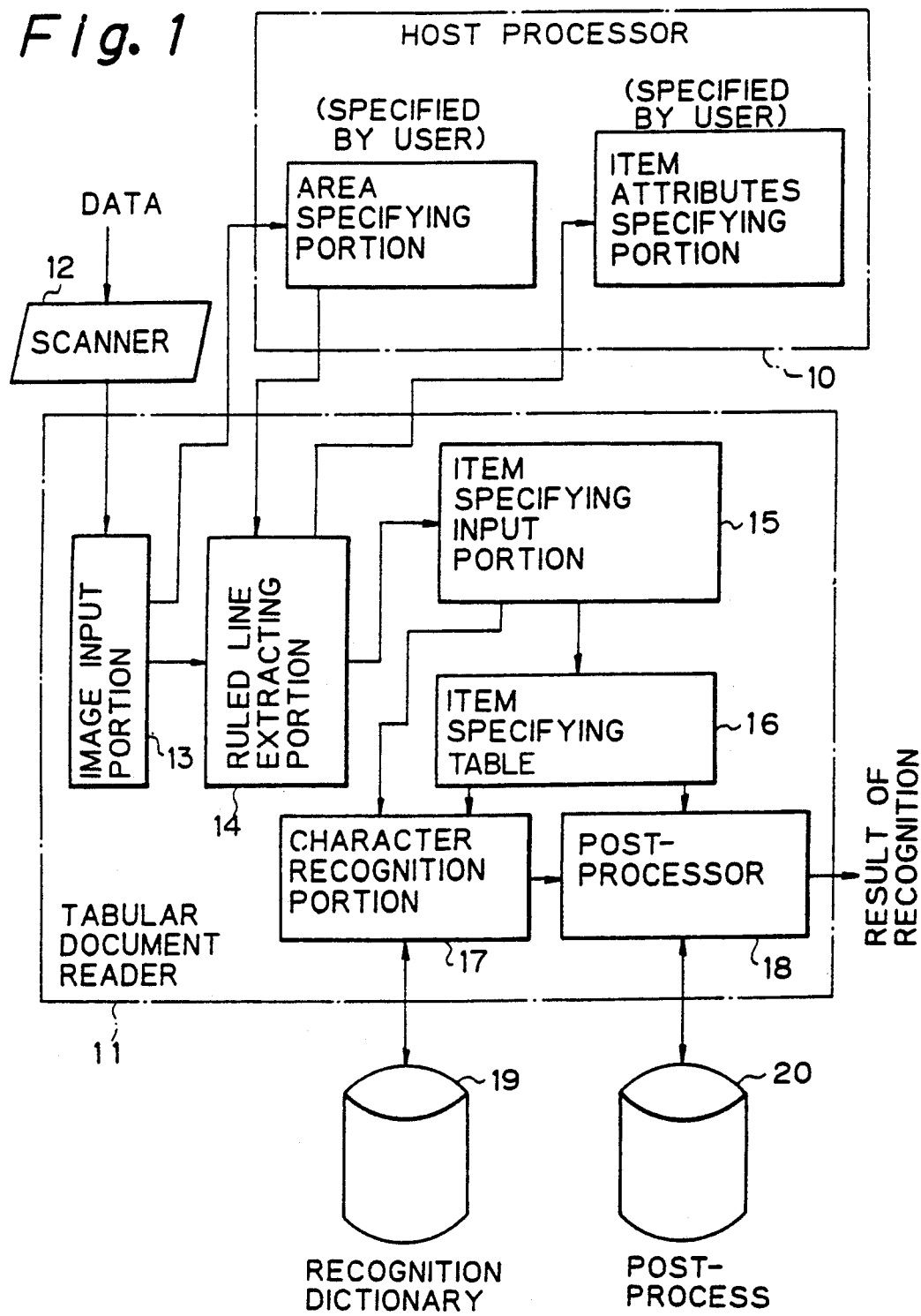
FIG. 1 is a schematic diagram showing a tabular document reader in accordance with the present invention.

FIG. 1 is a schematic diagram showing the present invention.

In FIG. 1, numeral 10 denotes a host processor having a CPU, memories, etc., for processing a read document, 11 is a tabular document reader according to the present invention, 12 is a scanner for reading the document, 13 is an image input portion for receiving image data from the scanner 12, 14 is a ruled line extracting portion for extracting ruled lines of the document from the input image data, 15 is an item specifying input portion for specifying attributes of each item delimited by the ruled lines, 16 is an item specifying table having the attributive information of each item of the document, 17 is a character recognizing portion, 18 is a postprocessor for limiting candidate characters for recognition with the use of word information, 19 is a recognition dictionary that stores characteristics of characters used for character recognition, and 20 are postprocess dictionaries containing the word information, etc.

The image input portion 13 receives image data of a tabular document from the scanner 12, and supplies the image data to the host processor 10 and to the ruled line extracting portion 14.

The host processor 10 specifies a reading area on the document, and the ruled line extracting portion 14 receives the data of the area to be read from the host processor 10. The ruled line extracting portion 14 extracts ruled lines between items from the area, and transfers the positional information of the extracted ruled lines to the host processor 10.

The item specifying input portion 15 receives the item specifying table 16 from the host processor 10. The item specifying table 16 contains information for limiting what should be recognized in the respective items and information of postprocess conditions.

According to the positions of characters and ruled lines and the item specifying table 16, the character recognizing portion 17 limits an object to be recognized in each item and recognizes characters with reference to the recognition dictionary 19. The limitation of an object to be recognized in each item involves limiting the kinds of characters appearing in the item to numerals, capital letters and small letters, symbols, user registered characters or the like. The various kinds of characters are stored in the recognition dictionary 19.

The dictionaries 20 include postprocessing word dictionaries such as a name dictionary, an address dictionary or the like. The postprocessor 18 refers to the postprocess dictionaries 20 specified in the item specifying table 16 and selects a correct one from among candidate characters. The postprocessing may be done in the host processor 10.

The ruled line extracting portion 14 extracts ruled lines, thereby delimiting the items from one another. According to the attributes of each item provided by the item specifying input portion 15, the character recognizing portion 17 and postprocessor 18 can limit an object to be recognized and select a proper word for the item.

Figure 2:
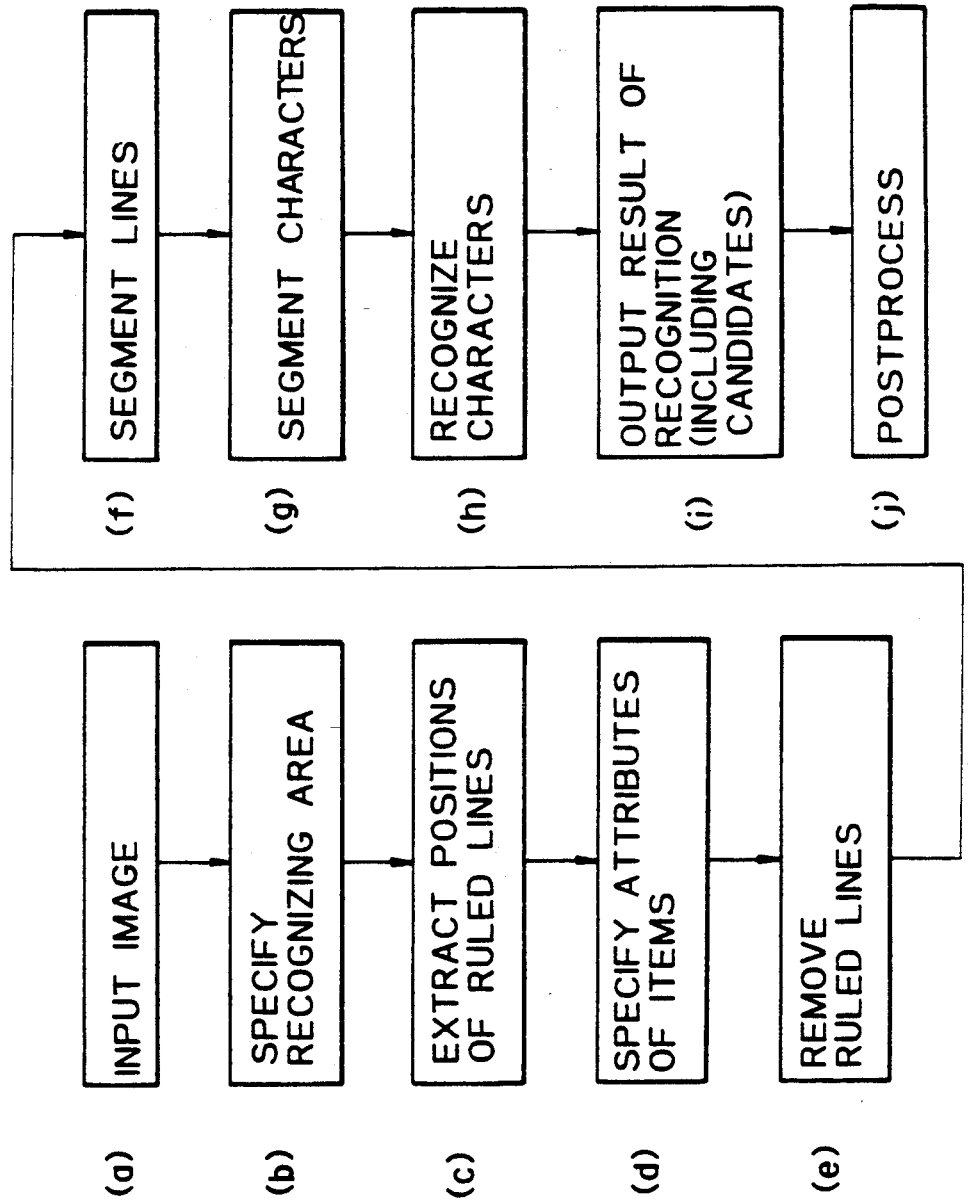
FIG. 2 is a flowchart showing processes carried out by a tabular document reader in accordance with an embodiment of the present invention.
Figure 5:
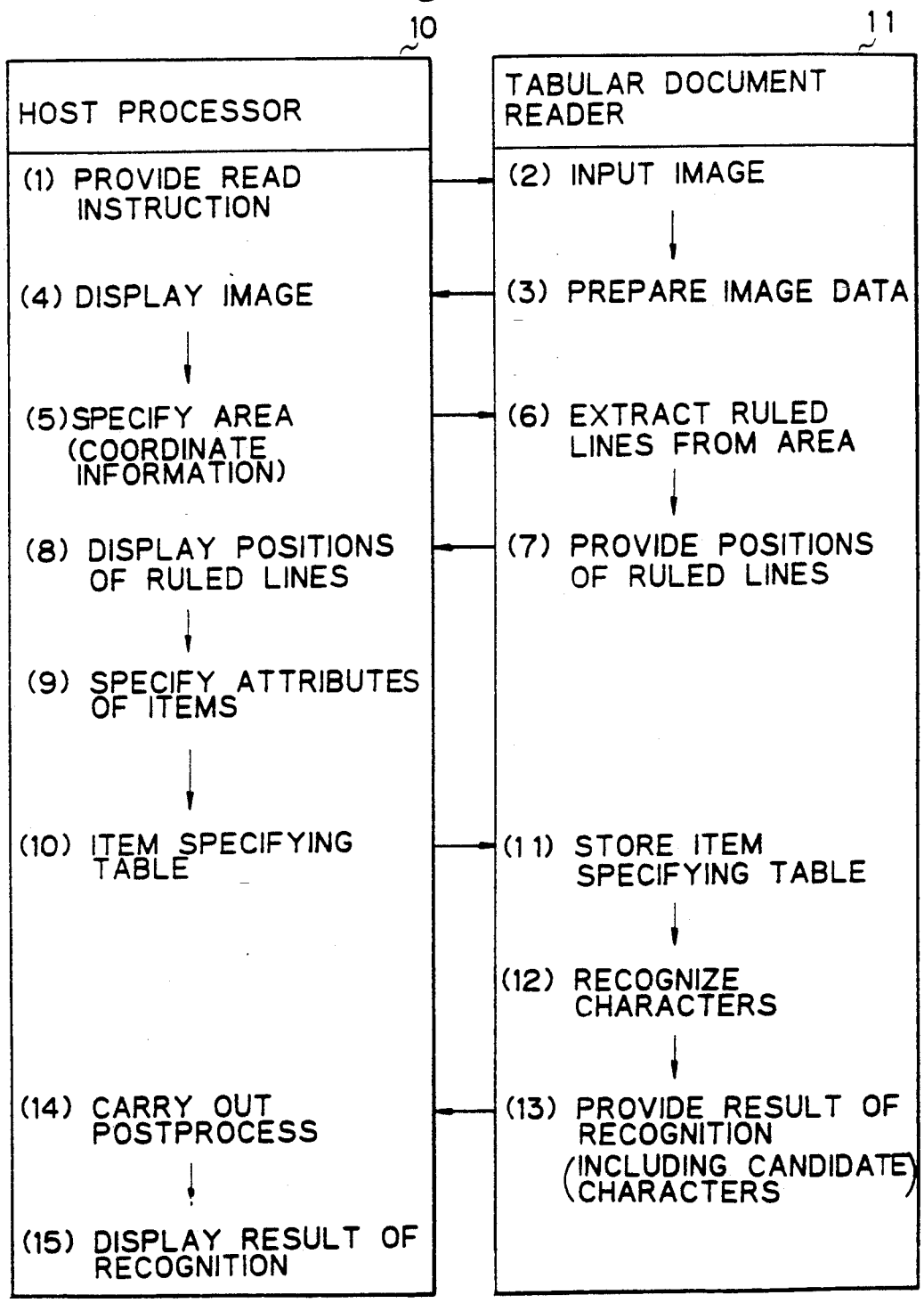
FIG. 5 is an example of ans operation of an interface between a host processor and the tabular document reader according to the embodiment of the present invention.

FIG. 2 is a flowchart showing processes carried out by the tabular document reader device in accordance with the present invention; FIG. 3 is a list of names as an example of a tabular document to be recognized by the tabular document reader; FIG. 4 is an example of an item specifying table employed by the embodiment of the present invention; FIG. 5 is an example of an interface between a host processor and the tabular document reader; FIG. 6 is an example of input image data for explaining the embodiment of the present invention; and FIG. 7 is an example of a result of recognition of the image data of FIG. 6.

According to FIGS. 2 to 4, an operation of the tabular document reader in accordance with the present invention will be described.

(a) The document reader optically scans a tabular document such as the list of names shown in FIG. 3, and converts a read image into binary information. The list of names of FIG. 3 consists of three items, "Name," "Address," and "Telephone Number."

(b) The document reader receives information of a recognizing area for the input image data from the host processor. This information involves, for example, coordinates of the starting position at the upper left part of the list and of the ending position at the lower right part of the list.

(c) The document reader extracts positions of ruled lines in the recognizing area. The ruled lines may be obtainable by counting the number of black dots along each column and by detecting a peak of a histogram of the counted dots. The host processor provides information in advance to the document reader to show whether the items of the document are arranged laterally or longitudinally. If the items are arranged laterally, the document reader extracts longitudinal ruled lines, and if the items are arranged longitudinally, extracts lateral ruled lines. It is possible to extract both lateral and longitudinal ruled lines.

(d) The document reader informs the host processor of the positions of the ruled lines, and the host processor specifies attributes of the items that are delimited from one another by the ruled lines. The attributes are provided in the form of, for example, the item specifying table 16 of FIG. 4. This table specifies the kinds of characters to be recognized in the respective items and the postprocess dictionaries to be used in the postprocess.

(e) The document reader removes the ruled lines from the image data. Namely, it changes a value "1" of each black dot of the ruled line to a value "0", or a white dot.

(f) The document reader detects a blank between lines to delimit the lines.

(g) The document reader detects a blank between characters to delimit the characters.

(h) For the delimited characters, the document reader limits what kinds of characters should be recognized in each item according to the positions of the characters and ruled lines and with reference to the attributive information of the item according to the item specifying table 16, thereby recognizing the characters.

(i) The document reader provides a result of recognition including several candidates. The above processes (f) to (i) are repeated, and a predetermined item delimiter is put between adjacent items of the recognized result. Also, a predetermined line delimiter is put at the end of each line.

(j) Upon detecting the delimiter, the document reader selects a postprocess dictionary according to the item specifying table 16, and selects one from among the candidates as a recognition result.

According to the item specifying table 16 of FIG. 4, the document reader uses the name dictionary for names in item 1 and the address dictionary for addresses in item 2, and carries out the postprocess. For telephone numbers in item 3, the document reader omits the postprocess using the dictionaries, and provides a first recognition candidate as a result of recognition.

FIG. 5 shows an interface between the host processor 10 and the document reader 11. Numbers (1) to (15) of the figure will be explained.

(1) The host processor 10 provides an instruction to read a document image to the tabular document reader 11.

(2) and (3) The tabular document reader 11 reads the document image, stores image data in an internal memory, and transfers the image data to the host processor 10.

(4) and (5) The host processor 10 displays the image data on a display unit, and an operator specifies a reading area on the image data with the use of a mouse, etc. The host processor 10 transfers coordinates of the specified area to the tabular document reader 11.

(6) and (7) The tabular document reader 11 extracts ruled lines from the reading area, and informs the host processor 10 of the positions of the ruled lines.

(8) and (9) The host processor 10 displays the informed positions of the ruled lines, and the operator specifies attributes of each item.

(10) According to the specified attributes, the host processor 10 prepares an item specifying table, and transfers the data of the table to the tabular document reader 11.

(11) to (13) The tabular document reader 11 stores the item specifying table in the internal memory. To recognize characters, the reader 11 switches its reference to fields of the item specifying table according to the positions of characters and ruled lines, and limits what should be recognized in the respective items. The reader 11 then transfers a result of recognition including candidate characters to the host processor 10. The tabular document reader 11 may carry out the postprocess with the use of postprocess dictionaries. In the example of FIG. 5, however, the host processor 10 has the postprocess dictionaries, and carries out the postprocess on the result of recognition.

(14) and (15) For the recognition result including the candidate characters, the host processor 10 carries out the postprocess according to a postprocess dictionary selected according to the attributes of each item, and displays a final result of recognized characters after the postprocess. The operator confirms and corrects the recognition result, thus completing the processes.

According to FIGS. 6 and 7, a concrete example of reading a tabular document will be explained.

FIG. 6 shows an example of a tabular document to be read. After reading the document, the host processor 10 displays input image data of the document, and an operator inputs an object reading area 30 into the host processor 10. In this example, the operator inputs with the use of a mouse, coordinates (x1, y1) of the starting position at upper left part of the area 30 and coordinates (x2, y2) of the ending position at a lower right part of the area 30.

The reader 11 extracts ruled lines from the area 30, and the operator inputs attributes of each item delimited by the ruled lines. According to the input attributes, the host processor 10 prepares an item specifying table 16 such as the one shown in FIG. 4 including the various kinds of characters to be recognized and the information of postprocess dictionaries to be specified.

FIG. 7 shows an example of a result of recognition of the data shown in FIG. 6. The result of recognition includes several candidates. The example of FIG. 7 has already been limited according to the kinds of characters to be recognized but not yet subjected to a postprocess that uses the postprocess dictionaries. After the address dictionary, name dictionary, etc., are applied to the respective items, the result of recognition will be more accurate. In FIG. 7, S1 represents an item delimiter for delimiting items, and S2 is a line delimiter for indicating the end of each line.

We claim:

1. A tabular document reader device coupled to postprocess dictionaries, for recognizing characters on a tabular document which is composed of a plurality of items and which has different categories according to each of said items comprising:

ruled line extracting means for detecting and extracting ruled lines from the read tabular document;

item specifying input means for inputting selected reading conditions for items delimited by the extracted ruled lines and postprocess condition information based on the selected reading conditions;

character recognizing means for limiting what should be recognized in the respective items according to the input reading conditions for each of said respective items; and postprocessing means for carrying out postprocessing based on one of the postprocess dictionaries corresponding to said postprocess condition information.

2. The device according to claim 1, wherein, if the plurality of items are arranged in a lateral form, said ruled line extracting means extracts longitudinal ruled lines, and if the plurality of items are arranged in a longitudinal form, said ruled line extracting means extracts lateral ruled lines.

3. The device according to claim 1, wherein the selected reading conditions input by said item specifying input means include various kinds of characters for limiting what should be recognized in the respective items.

4. The device according to claim 1, further comprising an item specifying table divided into different categories for each item for storing the input data from said item specifying input means.

5. The device according to claim 4, wherein said character recognizing means delimits an object to be recognized in each item and recognizes characters with reference to said item specifying table.

6. The device according to claim 4, wherein when a plurality of characters as candidates for recognition are extracted by said character recognition means, said postprocessing means consults the postprocess dictionaries to select data based on said item specifying table, to determine the recognition result from among the plurality of candidate characters.

7. A method for reading a tabular document composed of a plurality of items having different categories, comprising the steps of:

(a) reading the tabular document;

(b) extracting ruled lines from the read tabular document;

(c) inputting selected reading conditions for items delimited by the extracted ruled lines and postprocess condition information based on the selected reading conditions;

(d) limiting what should be recognized in respective items according to the input reading conditions for each of said respective items; and (e) carrying out postprocessing based on one of a plurality of postprocess dictionaries corresponding to said postprocess condition information.

* * * * *